United States Patent [19]

Dunning et al.

[11] Patent Number: 5,118,956

[45] Date of Patent: Jun. 2, 1992

[54] TOUCH PROBE INCLUDING A WAVEGUIDE

[75] Inventors: Christopher C. Dunning, Bristol; Gillies D. Pitt, Hewelsfield; David Wilson, Stonehouse, all of United Kingdom

[73] Assignee: Renishaw, Gloucestershire, United Kingdom

[21] Appl. No.: 570,611

[22] Filed: Aug. 21, 1990

[30] Foreign Application Priority Data

Aug. 30, 1989 [GB] United Kingdom ............... 8919570
Aug. 30, 1989 [GB] United Kingdom ............... 8919571

[51] Int. Cl.⁵ .................. G01N 21/86; G01V 9/04; H01J 5/16
[52] U.S. Cl. ................. 250/561; 250/227.19; 250/227.21
[58] Field of Search ............... 250/227.21, 227.19, 250/227.14, 227.27, 561; 356/345, 351, 375; 73/800, 865.7; 33/561, DIG. 3, DIG. 4

[56] References Cited

U.S. PATENT DOCUMENTS

| | | |
|---|---|---|
| 4,177,568 | 12/1979 | Werner et al. |
| 4,222,669 | 9/1980 | Frosch et al. |
| 4,246,795 | 1/1981 | Sigg et al. |
| 4,294,121 | 10/1981 | Inoue |
| 4,358,960 | 11/1982 | Porter ............... 250/227.21 |
| 4,380,394 | 4/1983 | Stowe |
| 4,509,858 | 4/1985 | Smythe et al. |
| 4,561,776 | 12/1985 | Pryor |
| 4,670,989 | 6/1987 | Juengel ............... 33/561 |
| 4,694,184 | 9/1987 | Pryor ............... 33/561 |
| 4,763,421 | 8/1988 | Feichtinger |
| 5,018,280 | 5/1991 | Enderle et al. ............... 33/561 |

FOREIGN PATENT DOCUMENTS

| | | |
|---|---|---|
| 0164526 | 12/1985 | European Pat. Off. |
| 3508396 | 9/1985 | Fed. Rep. of Germany |
| 3933268 | 4/1990 | Fed. Rep. of Germany |
| 252233 | 12/1987 | German Democratic Rep. |
| 2009926 | 6/1979 | United Kingdom |
| 1570954 | 7/1980 | United Kingdom |
| 2070249 | 9/1981 | United Kingdom |
| 2085156 | 4/1982 | United Kingdom |

Primary Examiner—David C. Nelms
Assistant Examiner—John R. Lee
Attorney, Agent, or Firm—Oliff & Berridge

[57] ABSTRACT

A touch-trigger probe is provided with a sensor (which may be a mirror (106), an optical fibre (206), or a birefringent element (307)) which changes state by vibrating or undergoing strain when a stylus connected to the probe contacts a workpiece. The sensor is typically provided on (in the case of the mirror (106)), or in (in the case of the optical fibre (206)) the stylus. The change of state of the sensor causes a change in the path length, polarization state, or intensity of light waves conveyed by the sensor. An interferometer may be provided to detect such changes. Other forms of electromagnetic waves may be used to the same effect.

14 Claims, 5 Drawing Sheets

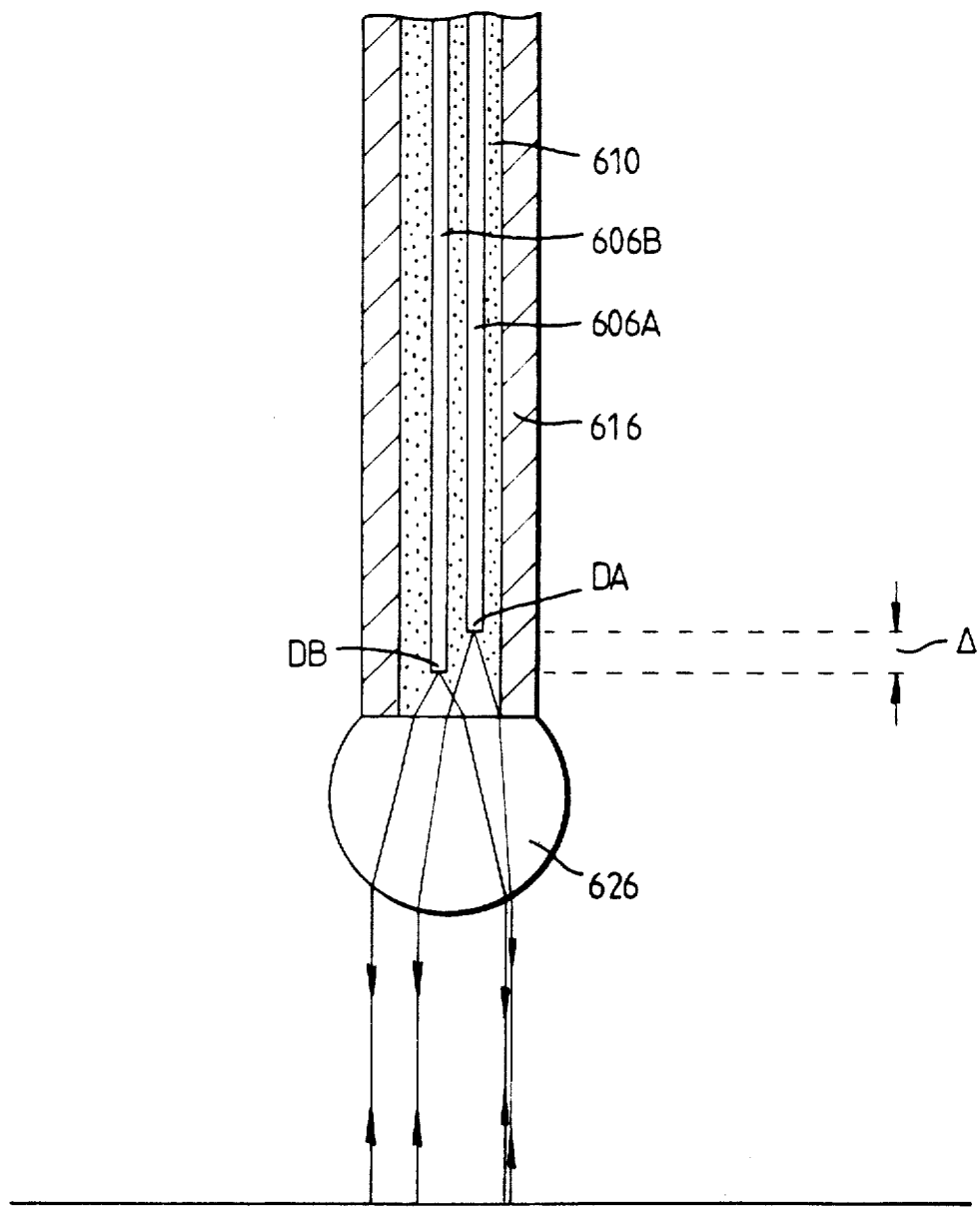

TOUCH PROBE INCLUDING A WAVEGUIDE

BACKGROUND OF THE INVENTION

The present invention relates to a touch probe, used for example, on a coordinate measuring machine or machine tool to determine the position of a workpiece.

A typical touch probe comprises a stylus mounted in a housing for movement from a rest position, and a mechanism for determining the instant of contact between the stylus and a workpiece. The instant such contact is detected, a signal is output from the probe which may be used to freeze the outputs of the readheads of the coordinate measuring machine or machine tool to which the probe is attached, thereby providing an indication of the position of the probe at the instant of the said contact.

SUMMARY OF THE INVENTION

A first aspect of the present invention seeks to provide a touch probe having a sensitive mechanism for detecting contact between a stylus and a workpiece.

According to the present invention there is provided a touch probe for sensing the position of a surface, having a housing, a stylus carrier supported within the housing for movement from a rest position, and an elongate stylus connected to the stylus carrier, the probe further comprising means for detecting contact between the stylus and the workpiece, the detecting means comprising:

an electromagnetic wave source for providing waves along a path;

a sensor provided in said path and coupled to the stylus, for interacting with said waves and for changing state responsive to deformation of the stylus prior to movement of the stylus carrier;

said change of state of the sensor causing a change in one or more of the properties of the waves; and a detector for detecting a said change.

The change of state of the sensor due to the deformation of the stylus, may for example, cause a change in the path length (and thus a change of phase), direction of propagation, or intensity of the waves.

In order to make manifest one or more of the above-mentioned property changes, the detector may for example comprise one or more of an interferometer, polarizing optics, or one or more photodetectors.

A second aspect of the present invention provides a stylus for a touch probe comprising an elongate body having means provided at one end for connecting said body to the touch probe, and a sensing tip for contacting a workpiece provided at a another end of the body, wherein a waveguide for electromagnetic waves is coupled to said stylus.

Preferably the waveguide will extend from said one end of the stylus and toward the sensing tip. The waveguide will preferably be situated inside the stylus, and may for example be an optical fibre or a suitably shaped bore. The stylus may be provided with a plurality of sensing tips each connected to the body at a free end, and a corresponding number of waveguides extending from said one end to a said sensing tip.

The or each sensing tip may be translucent to transmit light passing out of the end of the waveguide onto the surface of a workpiece.

In a particular example of this second aspect of the present invention, a plurality of waveguides may be provided, each of which extends to the same sensing tip.

In a further example, a plurality of light beams, each having a different wavelength, may be passed down the same waveguide.

BRIEF DESCRIPTION OF THE DRAWINGS

Embodiments of the invention will described, by way of example, and with reference to the accompanying drawings in which:

FIGS. 6a and 6b show modified forms of the second embodiment for use in scanning operations.

DESCRIPTION OF THE PREFERRED EMBODIMENTS

Figure 1:
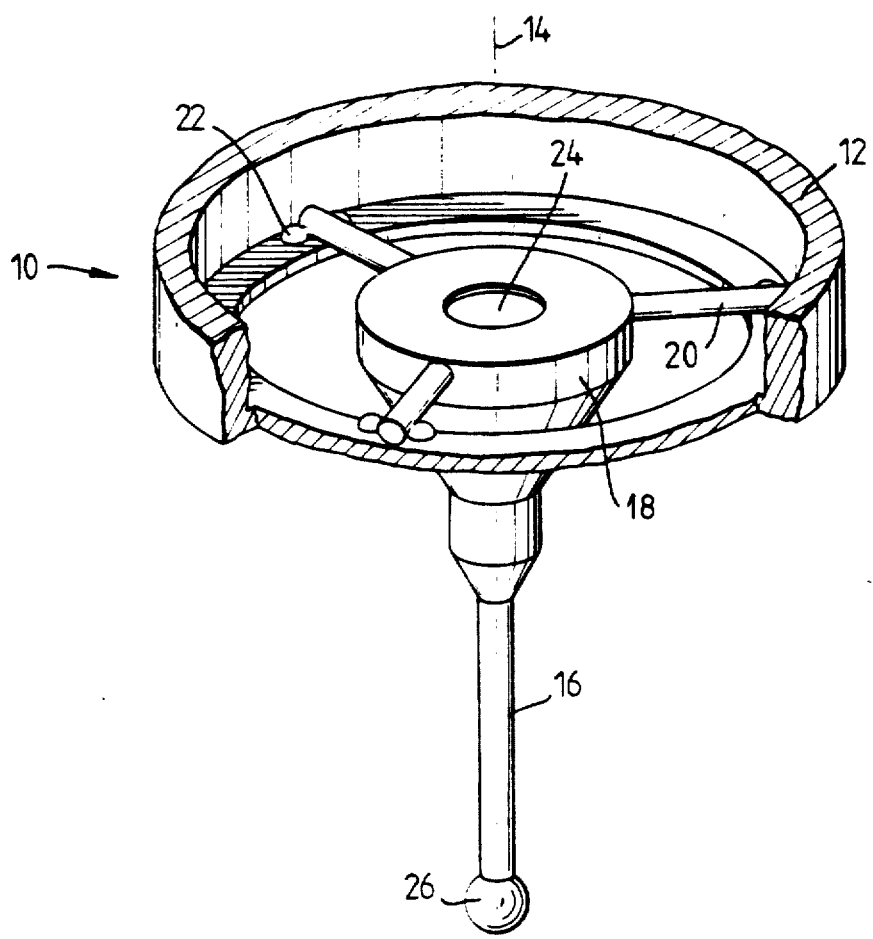
FIG. 1 shows a perspective view of a part of a touch trigger probe.

Referring now to FIG. 1, an example of a touch probe is indicated by reference numeral 10. Specifically, the probe shown is a touch trigger probe, however the present invention may equally be applied to any known type of touch probe. In operation, the probe 10 is attached to the head of a coordinate positioning machine (e.g. a coordinate measuring machine) or machine tool which is not shown.

The probe 10 comprises a cylindrical housing 12 whose axis 14 defines the axis of the probe. A stylus 16, for contacting a workpiece, is connected to the probe 10 via a stylus carrier 18. The stylus carrier 18 is supported by the housing via three cylindrical rollers 20, which extend from the carrier 18 orthogonal to the axis 14 and equidistant from each other. Each roller 20 rests upon the convergent surfaces defined by an adjacent pair of balls 22; the stylus carrier 18 and stylus 16 are thus kinematically supported with respect to the housing 12 of the probe 10. A spring (not shown) is provided in order to urge the stylus carrier 18 into its kinematic location. The end of the spring proximal to the stylus carrier 18, will rest in conical seating 24. The stylus 16 has a sensing tip 26, which is most frequently spherical, but which may also for example be cubic, or disc-like, and it is this part of the stylus 16 which touches the workpiece.

On contacting a workpiece the stylus 16 deforms slightly and subsequently the stylus carrier 18 is deflected from its rest position (i.e. one or more of the rollers 20 are lifted from their convergent surface contacts with the balls 22) as the head of the machine overtravels the point of contact between the sensing tip 26 and the workpiece. However, upon the sensing tip 26 losing contact with the workpiece, the stylus carrier 18 reseats in exactly the same position relative to the housing 12 by virtue of its kinematic support; the sensing tip 26 is thus returned to the same position as it occupied prior to contact with the workpiece.

The following embodiments of the present invention all seek to provide sensitive means of determining the instant of contact between the sensing tip 26 and a workpiece.

In the first embodiment of the present invention, a light reflective surface is provided as a sensor. The reflective surface is incorporated into a wall of a diaphragm sensitive to the frequency of vibrations excited in the stylus and stylus carrier upon contact of the sensing tip with a workpiece. Thus, deformation (in this case vibration) of the stylus due to contact of the sensing tip with a workpiece causes a change of state in the reflective surface since it causes the reflective surface to vibrate. This vibration of the reflective surface will cause a change in the path length of the light incident on the reflective surface, and detection of this change in path length corresponds to detection of contact between the stylus and a workpiece.

Figure 2:
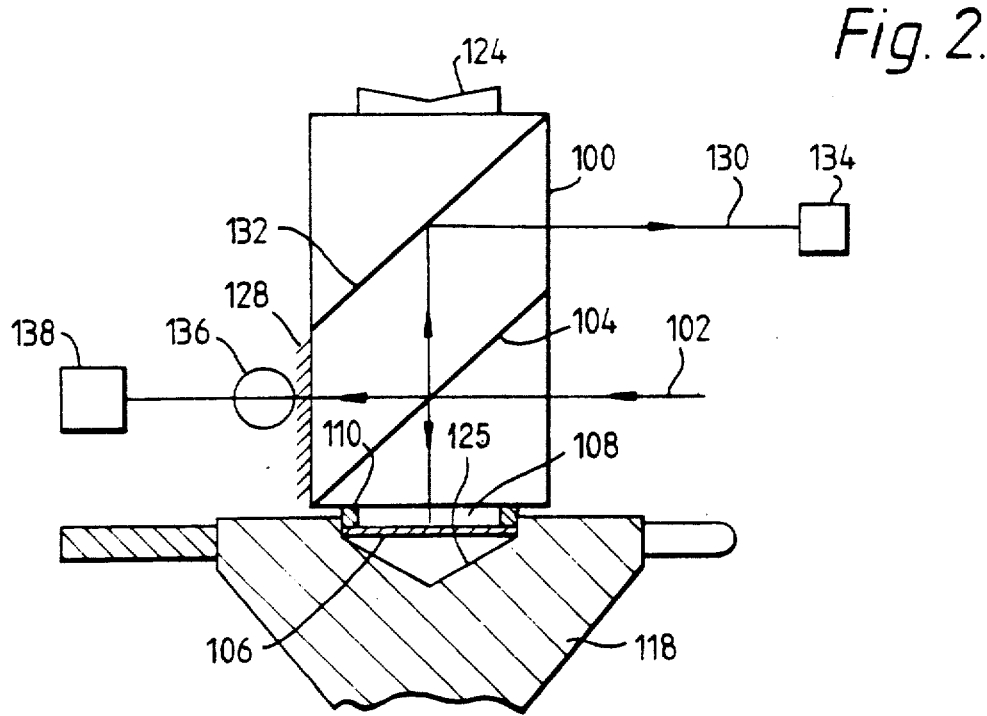
FIG. 2 shows a section through a first embodiment of the present invention.

A specific form of this embodiment will now be described with reference to FIG. 2. An interferometer cube 100 is mounted on the carrier 118. A beam of laser light 102 entering the interferometer is split by beam splitter 104, and the part of the beam 102 deflected by beam splitter 104 is incident upon, and reflected off a mirror 106 which forms one wall of a diaphragm 108. The mirror 106 is typically a circular microscope coverslide. The diaphragm 108 is formed by laying the mirror 106 on top of the surface of the interferometer cube 100, and depositing spots of liquid cement 110 on the edges of the mirror 106. The cement will be drawn underneath the mirror 106 by capillary action, causing the mirror to lift a small distance off the surface of interferometer cube 100. Hardening of the cement 110 results in creation of diaphragm 108. Interferometer cube 100 is mounted onto the stylus carrier 118 via the diaphragm 108. Specifically, the mirror 106 rests in the conical recess 125 provided for the spring (not shown). A recess 124 is provided on the interferometer cube 100 for the spring to rest on when urging the assembly of cube 100 and stylus carrier 118 into the kinematic support (shown in FIG. 1).

The fraction of the beam 102 which passes through beam splitter 104 without deviation is incident upon a mirror 128. The beams reflected from the mirrors 106 and 128 are recombined to form an output beam 130, which is deflected out of the interferometer cube 100 via a further mirror 132, and forms an interference pattern at detector 134.

Vibration of the mirror 106 (caused by vibrational deformation of the stylus due to stylus-workpiece contact), results in a change in the path length of the light incident on, and reflected off the mirror 106. This change in path length manifests itself as a shift in the interference pattern at detector 134. Vibration of the mirror 106 will cause the surface of the mirror to flex, which will in turn cause a change in the direction of propagation of light reflected off the mirror. If desired, this may be detected as well as, or instead of the change in path length.

It is obviously desirable to make the detector as sensitive as possible to a shift in the interference fringes. To achieve this the ratio $\Delta I : I$
where:
 I is the light intensity incident upon the detector before the fringe shift
 $\Delta I$ is the change in light intensity incident upon the detector as a result of the shift in the fringes
should be as large as possible. This may be achieved by providing a detector which has dimensions which are as small as possible in relation to the fringe width. However, such a detector must output signals large enough to enable detection of a change in the output signal level. A compromise between these two requirements has been found to be a detector having a width equal to half a fringe.

It may be desirable, in order to provide greater sensitivity, to extend the stylus 116 through the stylus carrier 118 so that the stylus 116 rests against the surface of the mirror 106. This enables direct transmission of any vibration in the stylus 116 to the mirror 106.

Because the laser beam 102 is fixed relative to the housing of the probe, a further independent aspect to the present invention is to use this beam as a reference axis, relative to which the position of the stylus carrier 11B (and thus the stylus) can be measured. This finds application for example in determining whether the stylus carrier 118 is incorrectly re-seated (for example due to dirt). To achieve this, means are provided on the stylus carrier for deflecting the laser beam through an angle, the size of the angle being dependent upon the position of the stylus carrier relative to the laser beam. A detector mounted independently of the stylus carrier detects the position of the deflected beam. Preferably, the angle of deflection corresponding to correct reseat will be zero (i.e. no deflection) and the deflection angle will increase with increasing deflection of the stylus carrier. An example of a system for detecting displacement of a stylus carrier will now be described.

Referring again to FIG. 2, the mirror 128 is a semi-silvered mirror, and therefore transmits a fraction of the beam 102. The transmitted beam passes through a deflector, which in this example is a transparent glass ball 136 attached to the outside of the interferometer cube 100. The fraction of the beam entering the ball 136 will be refracted by the ball 136 according to its point of entry. The refracted beam is incident upon a two-dimensional position sensitive detector 138. When the stylus carrier 118 is correctly re-seated relative to the housing the refracted beam is undeviated on its passage through the ball 136, because it enters the ball perpendicular to the local ball surface. A deviation of the refracted beam through the ball 136 is indicative of an incorrect re-stat of the stylus carrier (which may for example be due to dirt). This re-seat check mechanism may, if desired also be used to provide information on the degree of deflection of the stylus from its rest position during operation of the probe.

A more accurate reseat check mechanism is to provide two laser beams with distinct (but similar) wavelengths, in conjunction with an interferometer mounted on the stylus carrier and a detector provided in respect of each beam mounted independently of the stylus carrier. Because the beams have different wavelengths, the frequency of the two interference patterns will be different. However, by virtue of the frequency difference, the two patterns will cyclically come into phase with each other; within one such cycle, the relative phase of the two patterns provides absolute measurement. Thus, a given relative phase may correspond to correct reseat, and a shift from this relative phase indicate uncorrect reseat.

In this, and following embodiments, it can be seen that it is not essential to provide the light source (e.g. the laser) in the probe. The aperture in the probe housing provided to allow a beam in may thus be said to act as a light source.

When the stylus contacts a workpiece, a far greater degree of deformation (due to strain and/or vibration in the stylus) is experienced at the sensing tip of the stylus than at the point where the stylus is connected to the stylus carrier. It is thus desirable to situate the sensor as close as possible to the sensing tip of the stylus in order that it may more easily be excited into a change of state by deformation of the stylus. A second embodiment of the present invention provides a sensor which extends from the stylus carrier to the sensing tip of the stylus. This sensor may thus be excited into a change of state both by deformation of the stylus due to vibration, and deformation in the stylus due to strain.

Figure 3:
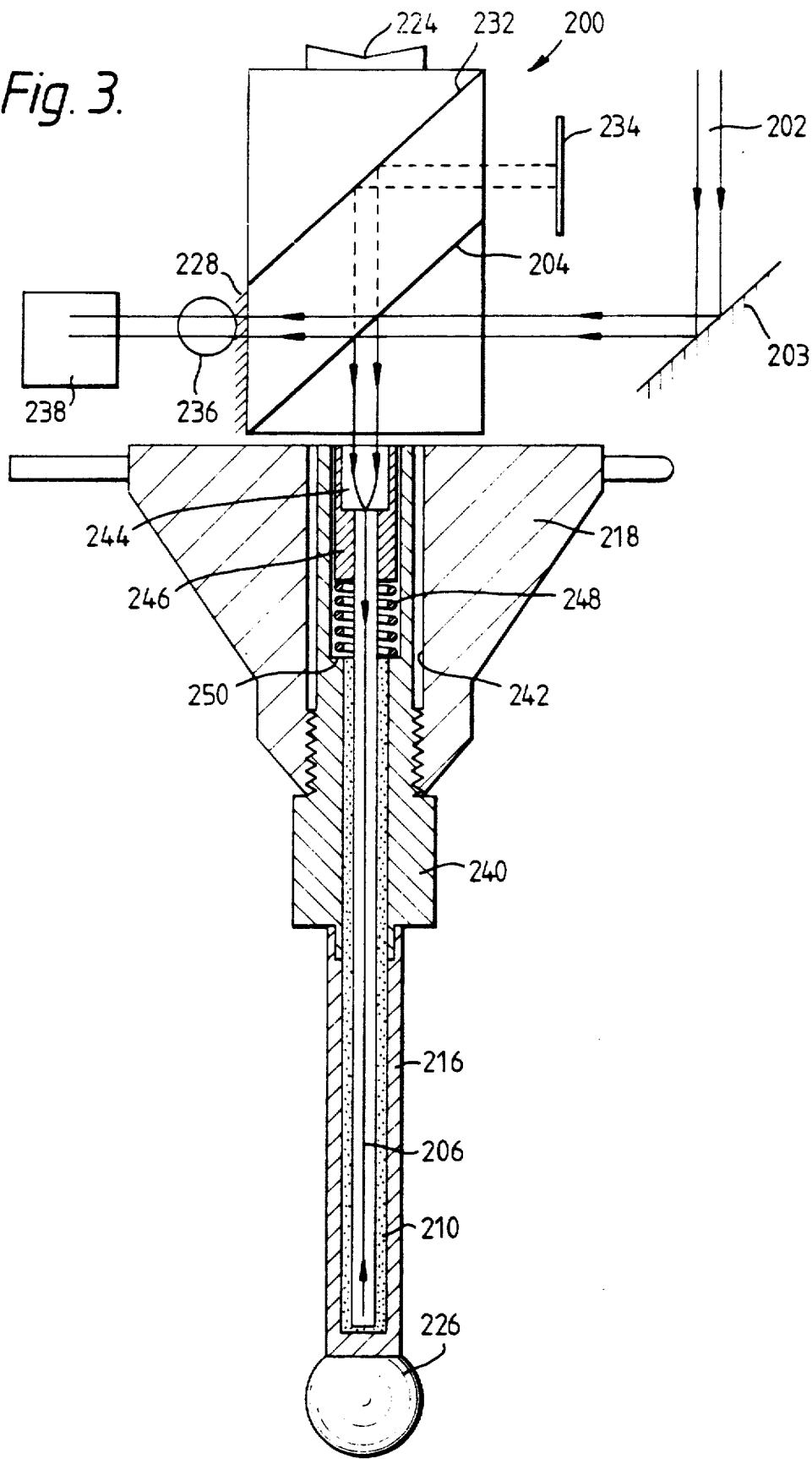
FIG. 3 shows a section through a second embodiment of the present invention.

Referring now to FIG. 3, an interferometer cube 200 is mounted on a stylus carrier 218. The interferometer cube 200 functions in the same way as interferometer cube 100, by directing part of the incident laser beam into a sensing arm, which incorporates the sensor (in this case a waveguide inside the stylus provided by an optical fibre 206), and part into a reference arm of the interferometer defined by semi-silvered mirror 228.

Thus, laser beam 202 is incident upon beam splitter 204 via a plane mirror 203, and the fraction of the beam 202 deflected by beam splitter 204 is directed down optical fibre 206. The fibre 206 is housed in a ceramic stylus 216 and is secured in place by a potting compound 210. The stylus 216 is connected to the stylus carrier 218 by a hollow steel connector 240, which screws into the stylus carrier 218. The connector 240 extends through the stylus carrier 218 in a bore 242 provided in the body of the stylus carrier 218, and the free end of the connector 240 lies adjacent interferometer cube 200. The optical fibre 206 extends from the free end of the connector 240 to the sensing tip 226 of the stylus 216.

In order to focus the beam 202 into the optical fibre 206, a graded refractive index (GRIN) lens 244 is provided in the free end of connector 240 adjacent the free end of the fibre 206. The GRIN lens 244 enables some tolerance in the relative position of the free end of the fibre 206 and the beam 202, and thus enables the use of a number of different styli 216 with the same stylus carrier 218. The above mentioned tolerance would not for example exist if the laser beam were focussed externally of the connector (e.g. by a lens in the cube 200) directly into the fibre 206. An aluminium collar 246 sleeves both the free end of fibre 206 and the GRIN lens 244, thus fixing their relative position. The exact position of the collar 246 relative to the connector 240 is fixed by providing a thin film of potting compound between the collar 246 and the inside of the connector 240. A spring 248 abuts at one end a flange 250 in the connector 240, and at the other end the collar 246; the collar 246 is retained in the connector by a clamp while the potting compound hardens.

The end of optical fibre 206 which lies adjacent the sensing tip 226 of the stylus 216 is silvered to reflect light passing down the fibre back up into the interferometer cube 200. As with the previous embodiment the reflected beams are combined to form an output beam 230 deflected to a detector 234 via mirror 232. An interference pattern is thus formed at detector 234. Contact between the stylus and a workpiece causes the stylus 216 to deform, which in turn changes the state of the fibre 206 since it also deforms, and thus a shift in the pattern at detector 234.

A reseat error check mechanism is provided as with embodiment 1, which uses a glass ball 236 and a position sensitive detector 238; these function in exactly the same way as described in the first embodiment of the present invention.

Preferably, the fibre 206 will be a monomode fibre since this makes a shift in the interference pattern easier to detect. However such fibres are difficult to handle and so it may be (e.g. for manufacturing reasons) be preferable to use multimode fibre. When multimode fibre is employed the interference pattern will be a speckle pattern. In such a case the detector may be:

1. A single photodetector of the same order of size of surface area as an individual speckle.

2. A large area detector consisting of many individual photosensitive cells, each with associated electronics such that each cell produces a signal corresponding to the modulus of the differential of the function describing the variation of light intensity falling on that cell with time. The outputs of the cells are summed to produce a signal.

3. A large area (A) detector constructed from a material or composite of materials which has the intrinsic property of producing a signal amplitude S such that:

$$S = \int_A \frac{dI(t)}{dt} dA$$

4. A scanned charge coupled detector area and processing system so as to provide the signal described.

Figure 4:
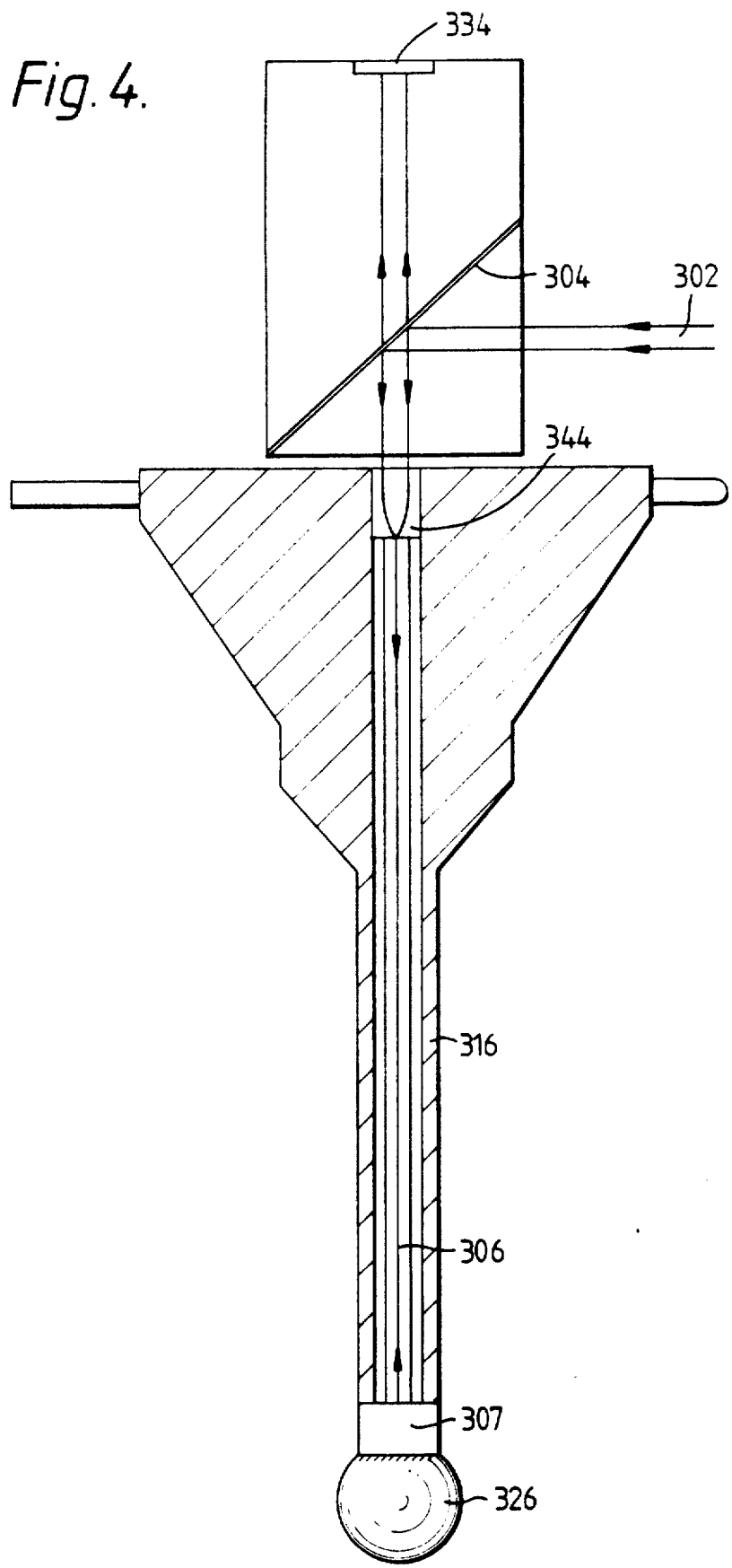
FIG. 4 shows a section through a third embodiment of the present invention.

The third embodiment of the present invention also situates the sensor in the proximity of the sensing tip of the stylus. Referring now to FIG. 4, a sensing tip 326 is attached to a stylus 316 via bi-refringent element 307. The stylus 316 is hollow, thus enabling a polarized laser beam 302 to be directed down the centre of the stylus onto the bi-refringent element 307 by semi-silvered polarizing mirror 304. Bi-refringent element 307 reflects the beam 302 back up the centre of the stylus in the same polarization state, and thus light is reflected off mirror 304 and does not pass through the semi-silvered mirror 304 to detector 334. In the specific example illustrated in FIG. 4 of this embodiment of the present invention, a GRIN lens 344 and polarization preserving optical fibre 306 are provided for transmitting the light to, and away from the bi-refringent element 307. The provision of an optical fibre to transmit light to element 307 is not necessarily an essential feature of this embodiment of the present invention, however, it may be required in the event that a long stylus 316 is employed. When the sensing tip 326 of the stylus 316 is brought into contact with a workpiece, the bi-refringent element 307 deforms simultaneously with the stylus 316, since in this example the element 307 actually forms a part of the stylus 316 (the sensing tip 326 is connected to the remainder of the stylus 316 by the element 307). The deformation of the bi-refringent element 307 changes its state since it causes the element to alter slightly the polarization state of part of the reflected light beam 302. Part of the beam 302 will therefore now pass through the semi-silvered polarizing mirror 304 and will be incident upon the detector 334. Thus, an increase in light intensity incident upon the detector 334 corresponds to contact between the stylus 316 and a workpiece. This embodiment has the advantage that a less sophisticated detection arrangement is required to detect the change of state of the sensor upon stylus-workpiece contact.

In a further embodiment of the present invention the sensing tip of the stylus is incorporated as a sensor. This is achieved by providing an optical fibre 406 inside a stylus 416, the end of the fibre 406 being unsilvered. The end D of a fibre 406 is situated inside the sensing tip 426 of the stylus 416 and provides a point source of light within the sensing tip 426. The sensing tip 426 is spherical and manufactured of a translucent material, for example, artificial ruby. The end D of the fibre 406 is preferably situated at the centre of the spherical sensing tip 426, and thus light leaving fibre 406 is incident upon the interior surface of the sensing tip 426 at an angle which is substantially perpendicular to the local surface. Some of the light will thus be reflected back into the fibre 406. When the sensing tip 426 contacts a workpiece, the tip will deform; some of the light which was previously reflected back into the fibre 406 off the interior surface of sensing tip 426 will now pass out of the sensing tip 426, due to the change in the angle at which the light is incident upon the interior surface. Additionally, the path length of some of the light reflected back up the fibre 416 will change due to deformation of the sensing tip 426. Thus the change of state of the sensing tip 426 may be detected either by observing a change in intensity as shown in the embodiment of FIG. 4, or a change in path length, as shown in the embodiment of FIG. 3. The sensitivity of this embodiment may be increased by reducing the hardness of the sensing tip 426. This allows for measurement of softer surfaces.

Figure 5:
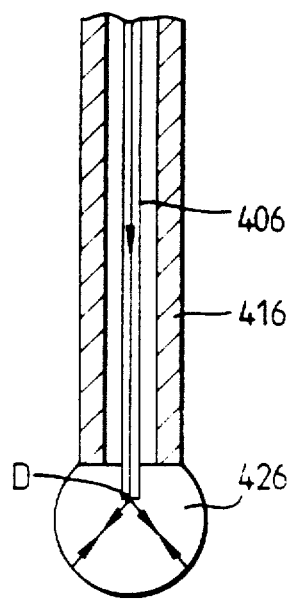
FIG. 5 shows a section through a fourth embodiment of the present invention.

In the embodiments of FIGS. 4 and 5 the optical fibres 306 and 406 may also function as additional sensors, depending on the manner in-which they are housed inside the styli 316 and 416 respectively. For example if it is desired to prevent the fibres from functioning as sensors, it is possible to prevent them from changing state upon deformation of the stylus by attaching each end of a fibre only to the relevent optic. Deformation of the styli will thus have little or no effect on the fibres. If however it is desirable to make the fibres sensitive to styli deformations, they should be housed as shown in FIG. 3, or tensioned inside the styli.

The sensitivity of the fibres to stylus deformation in the embodiments of FIGS. 3 to 5 may be increased (where appropriate) by increasing the fibre length for a given length of stylus. This may be done by coiling the fibre inside the stylus.

Figure 6A:
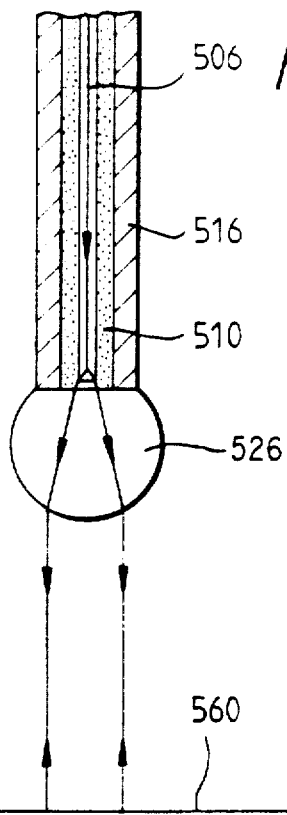

In yet a further independent aspect of the present invention it is possible to adapt the apparatus shown in FIG. 3 to provide a means for non-contact scanning of a workpiece. Referring now to FIG. 6a, a stylus 516 is completely hollow, and houses an optical fibre 506. As with the embodiments of FIG. 3 the fibre 506 is kept in place relative to the stylus 516 by a potting compound 510. The sensing tip 526 is translucent, and made for example, of artificial ruby. The end of the fibre adjacent the sensing tip 526 of the stylus 516 is un-silvered, and is situated approximately 1mm from the surface of the sensing tip 526. Light which discharges from the fibre 506 is focussed into a collimated beam by the sensing tip 526 and projected onto the surface of a workpiece 560. The collimated beam is reflected back off the workpiece 560 and focussed into the optical fibre 506 by the sensing tip 526; the reflected beam is re-combined with a beam from a reference arm of an interferometer (not shown in this figure) to form an interference pattern at a detector (also not shown). As the height between the surface of the workpiece 560 and the sensing tip of the stylus varies, the interference pattern at the detector will shift; a count of these shifting interference fringes will provide accurate information on the distance through which the stylus has moved.

This scanning system is incremental, and absolute information is required on the position of the sensing tip 526 relative to the workpiece 560 to provide a reference point from which to measure. This information may be obtained by bringing the sensing tip 526 of stylus 516 into contact with the workpiece surface 560. A sudden shift in the interference pattern at the detector will indicate that contact between the stylus and the workpiece 560 has occured (as with the apparatus shown in FIG. 3), and an incremental count can then be made from that point.

FIG. 6b shows a further development of a non-contact scanning aspect of the present invention. A pair of fibres 606A and 606B are housed inside a stylus 616, each being secured in place by potting compound 610. The discharge ends DA and DB of the fibres are at slightly different distances from the sensing tip 626. The distance $\Delta$ (of order of 0.3 microns) being accurately known. As with the embodiment of FIG. 6a, the apparatus is provided with an interferometer, and a separate detector in respect of each fibre 606A and 606B to enable counting of each resultant interference pattern. The interference patter produced in respect of each of the fibres 606A and 606B shifts as the stylus 616 moves relative to a workpiece 660 in the direction of the length of the stylus 616. However, because the discharge ends DA and DB of the fibres 606A and 606B are at different distances from the workpiece 660, a pulse produced at each detector (due to the shifting interference pattern at each detector) at different instances in time. The outputs of the two detectors is thus analogous to quadrature output from a readhead for a scale (see e.g. WO 87/07944). The two outputs thus provide information on which direction of the stylus is moving (i.e. 'up' or 'down') relative to the workpiece.

Alternatively, the ends DA and DB of the two fibres may be spaced further apart, such that an interference pattern is obtained in respect of each fibre over a different range of sensing tip - workpiece distance. If the measuring ranges associated with the two fibres are chosen so that they overlap, directional information may be obtained. For example, a decreasing intensity interference pattern in respect of one of the fibres, occurring simultaneously with an increasing intensity interference pattern in respect of the other fibre corresponds to movement of the stylus relative to the workpiece in a given direction. This modification also has the advantage of increasing the measuring range.

A plurality of fibres housed in the same stylus may be used in other ways, for example the discharge end of one of the fibres may be spaced from a sensing tip so as to produce an essentially parallel beam of light out of the sensing tip while the other fibre may be spaced from the sensing tip to produce a beam of light essentially focussed into a spot on the surface of the workpiece. The focussed spot beam is appropriate for rough surfaces, whereas the parallel beam is appropriate for smooth workpiece surfaces. A focussed spot beam may also be used as an optical trigger probe. To achieve this, the detector is adapted to produce a trigger signal when the beam comes into focus on the surface.

It is possible, in each of the above described scanning embodiments to transmit two (or more) beams of light down a single fibre, the light of each beam having a distinct (but similar) wavelength. A detector is provided in respect of each wavelength beam. As mentioned in relation to embodiment 1, the interference pattern in respect of each of the different wavelength light beams will have a different frequency, and the two patterns will (by virtue of the frequency difference) cyclically come into phase with each other. Thus within one such cycle the relative phase of the two patterns provides absolute measurement, and will therefore provide directional information.

In each of the aforementioned scanning embodiments it is possible to vary the driving current of the laser which produces the beam, to switch between a coherent and a non-coherent beam. A coherent beam is suitable for forming interference fringes and thus for scanning the position in space of a workpiece surface. By contrast, an incoherent beam used in conjunction with a photo-detector for detecting the intensity of light reflected back up the waveguide in the stylus, may be used as a surface finish probe for determining the degree of roughness of a surface.

It is not essential for the waves to be light waves. Microwaves may for example be used in a similar manner. For example a cavity inside a stylus which causes resonance of microwaves of a particular frequency may serve as a sensor. Deformation of the cavity due to stylus deformation would kill such resonance, and so indicate stylus-workpiece contact.

We claim:

1. A touch probe for sensing the position of a surface, having a housing, a stylus carrier supported within the housing, an elongate stylus connected to the stylus carrier, and means for providing a repeatable rest location for said stylus carrier in said housing, enabling movement of said stylus carrier from said rest position responsive to a deflecting force on the stylus and return of said stylus carrier to said rest position when said deflecting force is removed, the probe further comprising means for detecting contact between the stylus and the workpiece, the detecting means comprising:
   an electromagnetic wave source for providing waves along a path;
   a sensor provided in said path and coupled to the stylus, for interacting with said waves and for changing state responsive to deformation of the stylus prior to movement of the stylus carrier;
   said change of sate of the sensor causing a change in one or more of the properties of the waves; and
   a detector for detecting said change.

2. A probe according to claim 1, wherein said change of state of the sensor causes a change in the path length of the waves, and the detector comprises an interferometer for detecting a change in the path length, the interferometer having a sensing arm and a reference arm, wherein the sensor is provided in the reference arm of the interferometer.

3. A probe according to claim 1 wherein the sensor causes a change in the polarization state of the waves, and the detector comprises means for detecting a said change in the polarization state.

4. A probe according to claim 1 wherein said change of state of the sensor causes a change in the intensity of the waves, and the detector comprises means for detecting a said change in intensity.

5. A probe according to claim 2 wherein the sensor is a waveguide.

6. A probe according to claim 5 wherein the waveguide extends along at least a part of the length of the stylus.

7. A probe according to claim 6 wherein the waves are light waves, and the waveguide is an optical fibre.

8. A probe according to claim 2 wherein the sensor is a reflective surface sensitive to vibration excited on the stylus upon stylus-workpiece contact.

9. A probe according to claim 3 wherein the waves are light waves and the sensor is a bi-refringent element.

10. A probe according to claim 9, wherein the stylus comprises an elongate body and a sensing tip for contacting a workpiece, connected to said body at a free end of the body and wherein the sensing tip is connected to the body via the bi-refringent element.

11. A probe according to claim 4, wherein the waves are light waves and the stylus comprises an elongate body and a translucent sensing tip connected to said body at a free end of the body, and wherein the sensor comprises the translucent sensing tip in combination with a point light source provided within said tip.

12. A probe according to claim 11 wherein the point light source is provided by an optical fibre having a free end extending into said translucent sensing tip.

13. A probe according to claim 1 further comprising a sensing tip provided at a free end of said stylus for contacting a surface, and wherein said sensor is provided on the sensing tip.

14. A probe according to claim 13 wherein said sensing tip is fixedly secured to said stylus.

* * * * *